Patented Apr. 1, 1952

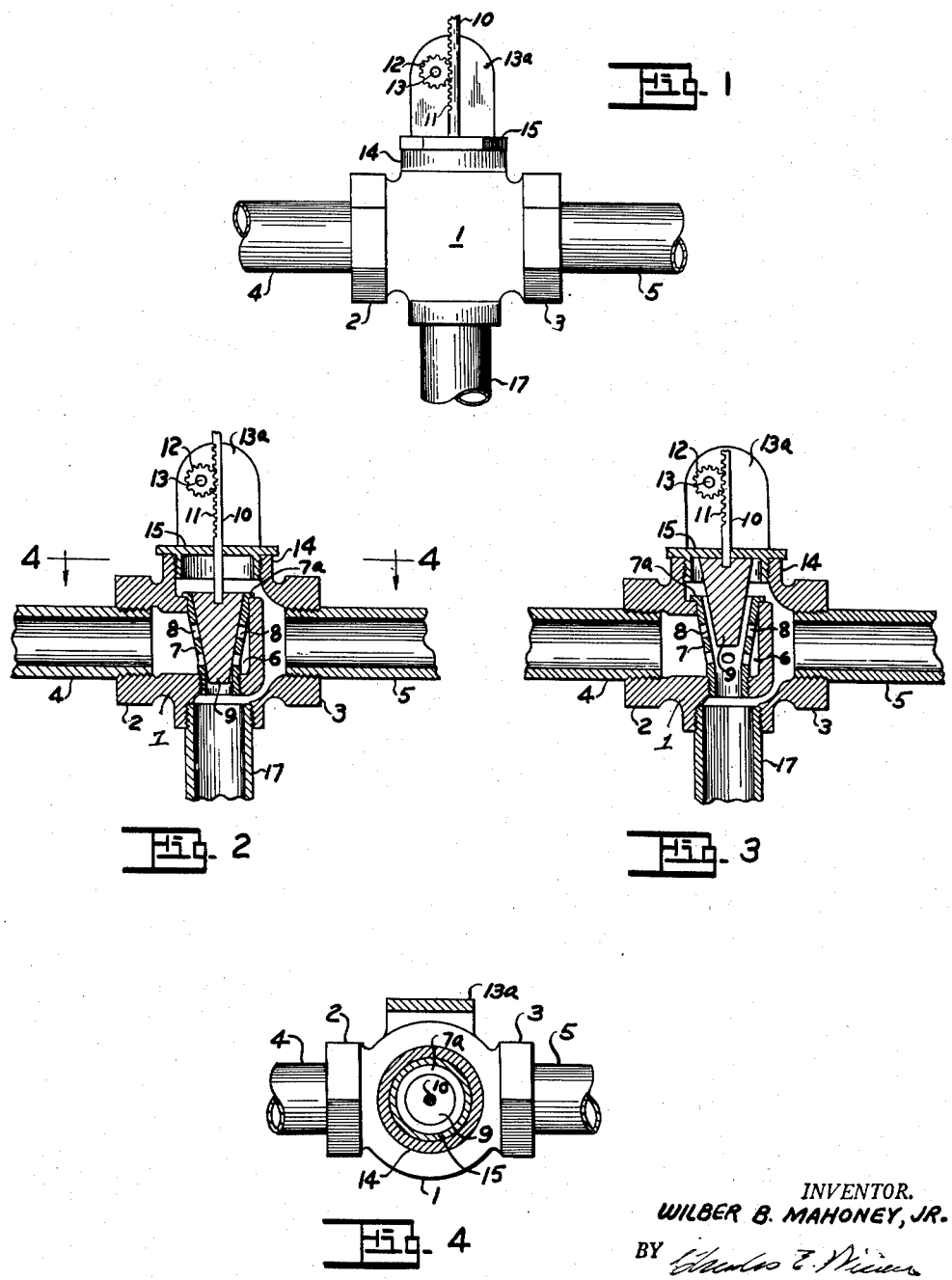

2,591,274

UNITED STATES PATENT OFFICE 2,591,274

FLOW CONTROL VALVE

Wilber B. Mahoney, Jr., Modesto, Calif.

Application March 10, 1948, Serial No. 14,082

1 Claim. (Cl. 251—73)

This invention relates to valves the object being to provide a new and improved form of valve for controlling flow of liquid in a conduit, an essential characteristic of which is what may be termed a valve seat of cone shape having apertures in its wall and an imperforate cone shaped element which is movable toward or from the seat. By moving the cone shaped member in one direction it is spaced from the inner wall of the seat permitting flow of water thereabout and thence to the outlet and movement of said member in the opposite direction to contact with the seat prevents flow through the valve.

These and other features and objects of the invention are hereinafter more fully described and claimed and the preferred form of a valve embodying my invention is shown in the accompanying drawing in which—

Fig. 1 is a side elevation of the valve.

Fig. 2 is a vertical cross section of the valve showing the valve in closed position.

Fig. 3 is a similar view showing the valve in open position.

Fig. 4 is a section taken on line 4—4 of Fig. 2.

The valve in its preferred form comprises a body 1 of chambered form having threaded ends 2 and 3 to receive the respective pipe sections 4 and 5. The inlet end 2 of the body is formed to provide a chamber 6 the upper wall of which is apertured to receive the cone shaped valve seat 7 having a flange 7a. This seat is provided with a series of apertures 8 in the side wall the number of which will depend upon the volume of flow required when the valve is in the full open position.

The valve 9 is a solid cone and has a stem 10 at the upper end which is toothed as indicated at 11 to engage the gear 12. The gear is mounted on the shaft 13 which is supported by a bracket 13a formed integral with or secured to the upper cylindrical portion 14 of the valve body. The portion 14 of the valve body is internally threaded to receive the threaded cap 15 which is provided with a central aperture to receive the operating stem 10. The bracket 13a supports the shaft 13 and by rotation of the shaft the valve body 9 may be moved upwardly to the position shown in Fig. 3 to permit flow of fluid through the apertures 8 and thence through an outlet conduit 5.

The drawing shows an additional conduit 17. It is to be understood however that one or the other of the conduits 5 or 17 may be dispensed with and a plug introduced in place thereof depending upon the arrangement of parts of the plumbing system.

In either case when the valve 9 is in the open position shown in Fig. 3 the water flows from the inlet 4 thence through the apertures in the cone shaped body 7 and thence downward through the outlet 17 or upward about the valve body to the outlet 5 depending upon which conduit is retained.

Having thus briefly described my invention, its utility and mode of operation, what I claim and desire to secure by Letters Patent of the United States is:

A valve comprising a chambered body having an inlet on one side and an outlet on the other side, a chambered element within said body opening to and joined to said inlet and spaced from said outlet and the interior walls of said body defining a passage to said outlet, said element having an aperture in its top wall and a threaded aperture of reduced diameter in its bottom wall, a hollow cone shaped valve seat positioned through said apertures, an annular flange at the upper end of said seat bearing upon said chambered element, a hollow cylindrical extension at the lower end of said seat exteriorly threaded to engage said threaded aperture for securing said seat relatively to said chambered element, there being a plurality of spaced transverse apertures in the walls of said valve seat within said chambered element, and an imperforate cone shaped member movable within said body adapted to seat within said valve seat to prevent the flow of fluid from said inlet to said outlet and when spaced from said seat adapted to permit flow from said inlet, through said apertures, through the interior of said seat and through said passage and outlet.

WILBER B. MAHONEY, Jr.

REFERENCES CITED

The following references are of record in the file of this patent:

UNITED STATES PATENTS

| Number | Name | Date |
| --- | --- | --- |
| 111,032 | Berryman | Jan. 17, 1871 |
| 779,973 | Zeitz | Jan. 10, 1905 |
| 1,111,244 | Wilson | Sept. 22, 1914 |
| 1,863,712 | Byfield | June 21, 1932 |

FOREIGN PATENTS

| Number | Country | Date |
| --- | --- | --- |
| 4,135 | Great Britain | of 1877 |
| 18,527 | Great Britain | of 1906 |